May 2, 1939.  A. R. BOZARTH  2,156,273
MANUFACTURE OF AMMONIUM HYDROGEN FLUORIDE
Filed April 27, 1938
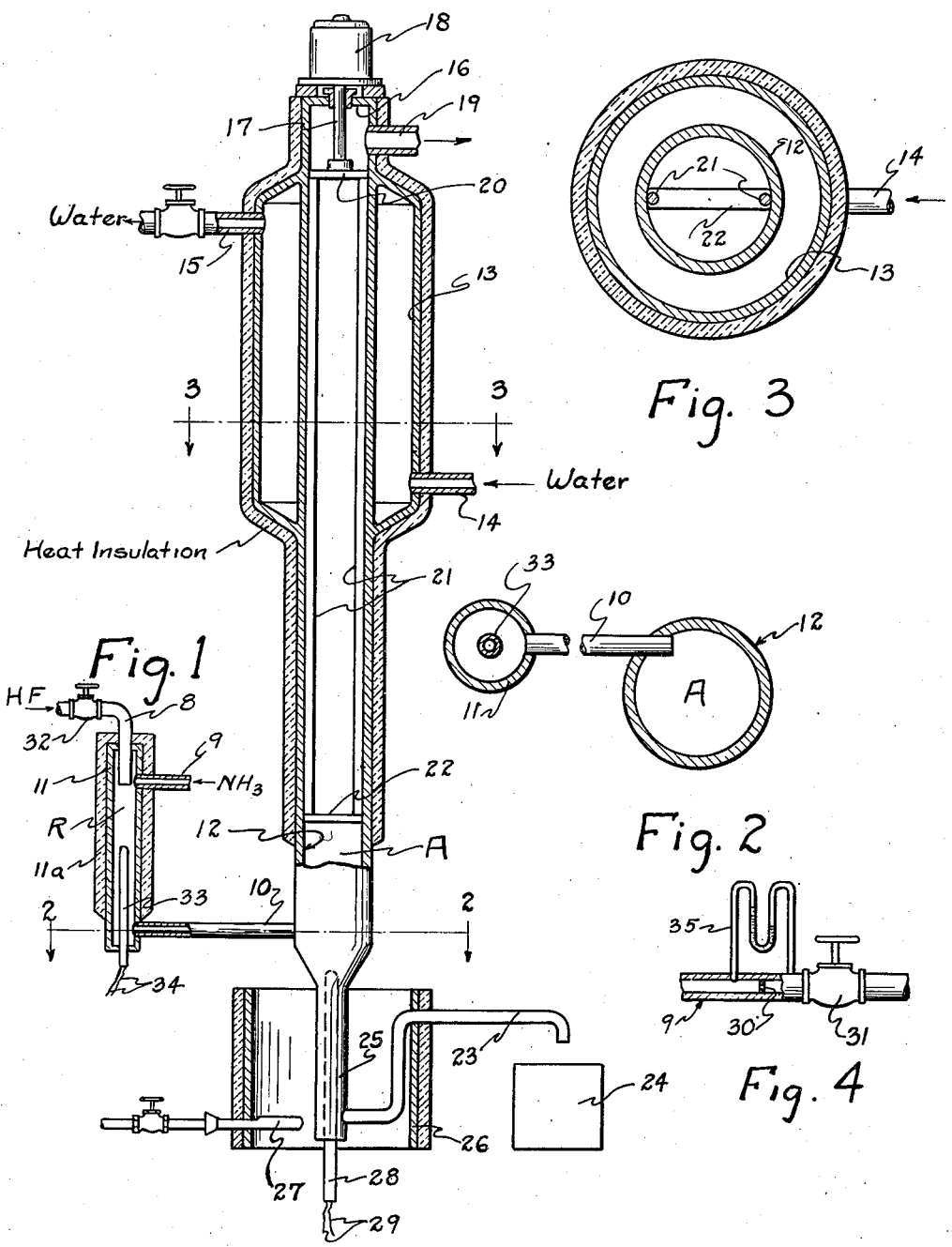
Abe R. Bozarth  INVENTOR.
BY William H Brown
ATTORNEY.

Patented May 2, 1939

2,156,273

UNITED STATES PATENT OFFICE 2,156,273

MANUFACTURE OF AMMONIUM HYDROGEN FLUORIDE

Abe R. Bozarth, Cleveland, Ohio, assignor to The Harshaw Chemical Company, Elyria, Ohio, a corporation of Ohio Application April 27, 1938, Serial No. 204,541

6 Claims. (Cl. 23—88)

This invention relates to manufacture of ammonium bifluoride, and has for its principal object to provide a very simple, practical and cheap method of producing ammonium bifluoride directly from $NH_3$ and $HF$.

It is known that when $NH_3$ and $HF$ are brought together in the proportions of one mol $NH_3$ to 2 mols $HF$, under proper conditions, solid $NH_4FHF$ is produced.

From a study of the properties of various combinations of $NH_3$, $HF$ and $H_2O$, under varying conditions, I have devised and proved the feasibility of certain hitherto unknown manipulations whereby $NH_3$ and $HF$, containing small proportions of water, can be reacted in a continuous process, requiring but little operating expense, to form, optionally according to conditions, a pure, substantially anhydrous product or a product containing a limited quantity of water.

The $NH_3$—$HF$ two-component system is thermally stable at the composition of $NH_4FHF$ and any liquid mixture of these components will, under heat, assume substantially the composition corresponding to the bifluoride. A small proportion of water, e. g., 5%, does not appreciably affect the result.

If $NH_3$ and $HF$ are brought together, in exactly the proportions required to produce $NH_4FHF$ at any temperature above the melting point of $NH_4FHF$ (about 125° C.), the reaction will go to completion and the product will be liquid and may be, therefore, easily removed from the reaction zone. The temperature of the reaction is determined by the temperature and physical state of the reactants, the construction of the reaction chamber, etc. I prefer to make use of the heat of reaction as the sole source of heat and to supply the $NH_3$ in gaseous condition and the $HF$ in liquid condition, both being supplied at convenient temperatures. I prefer to have the reaction take place in an insulated reaction chamber and to make use of the reaction temperature as an index to proper proportioning of reactants, since the maximum temperature is attained when the proportioning is substantially exactly theoretical.

Operation may be successfully carried out in such manner that the reaction temperature in the major reaction zone will be anywhere between the melting point of $NH_4FHF$ and the maximum temperature for adiabatic reaction. Using gaseous $NH_3$ and liquid $HF$ at room temperature and carrying out the reaction continuously in a well insulated reaction chamber, I have noted a reaction temperature of 290° C. With both reactants being admitted in the gas phase, a much higher temperature will be reached. The exact maximum temperature is not significant except as an index of proportions. It varies with the insulation of the reaction chamber, the rate of flow of the reactants, and the moisture content and temperature thereof. It is desirable, although not essential, to react at a temperature above the boiling point of $NH_4FHF$, which is about 240° C. under standard conditions. It is very desirable to react substantially exactly theoretical proportions of the reactants and the maximum temperature obtainable by variation of proportions is an excellent index to proper proportioning.

A lower reaction temperature can be secured by such expedients as cooling the reaction chamber, feeding the reactants at a lower rate, etc. If the reaction is carried out at such a temperature that liquid $NH_4FHF$ is formed in the principal reaction space, the product may contain a substantial proportion of water. If the combined water content of the reactants is below 5% of their combined weight, most of such water content will, at a low operating temperature, be retained in the product, apparently chemically bound, the product being an apparently dry solid. For most uses, this quantity of water can be tolerated and the retention thereof avoids some loss of product. This advantage of operating at low temperature, and the further advantage of lower cooling cost for condensing the gaseous product to a liquid are to be considered in connection with the advantages of high reaction temperature, and the best compromise adopted. The high reaction temperature results in the production of a substantially pure product and, in the event of slight imperfection in the proportioning of the reactants, the excess of either reactant is expelled. Thus, at a pressure approximately one atmosphere, reaction may be effected in the temperature range above 125° C. The corresponding low temperature limit for other pressures can be calculated and operation under varying pressures above the melting point of $NH_4FHF$ is within the contemplation of the invention.

I prefer to cool the gaseous reaction product to a liquid condition while allowing any water vapor, excess reactant and other relatively volatile gases to escape. This may be done, for example, by the use of a reflux condenser from the bottom of which liquid $NH_4FHF$ is drawn off to any suitable disposition such as a cooling pan, a flaking drum or the like. Preferably the product is cooled down nearly to its freezing point in the reflux condenser so as to avoid the presence of fumes.

In the practice of the above described process, I prefer to make use of apparatus such as illustrated in the accompanying drawing, wherein Fig. 1 is a schematic, vertical sectional view of one form of the apparatus; Fig. 2 is a section on the line 2—2 of Fig. 1; Fig. 3 is a section on the line 3—3 of Fig. 1; and Fig. 4 is a detail view of the ammonia supply pipe showing a construction which I employ for the purpose of securing as nearly as practical a constant flow.

In such drawing, the numerals 8 and 9 indicate respectively supply pipes for conducting HF and NH3 into a reaction space indicated by the letter R, wherein the reaction is believed to go to substantial completion. The reaction space R is defined and enclosed by a vertical pipe, indicated by the reference numeral 11, and which is provided with external heat insulation 11a. The reaction mixture passes continuously through the pipe 10 to the interior space A of a reflux condenser, the said space being substantially cylindrical and defined by a vertical pipe 12. This pipe may be composed of steel or any other suitable metal or alloy and is provided near its upper end with a water jacket 13 which, for convenience of illustration, has been indicated as being integral with such pipe 12. Cooling water is led into the water jacket 13 by an inlet pipe 14, and carried away therefrom by an outlet pipe 15. The upper end of the pipe 12 is provided with an end wall 16, through which is sealed the armature shaft 17 of an electric motor 18, supported in any convenient manner by the pipe 12. Extending through the pipe 12, adjacent to the upper end thereof, is a vent pipe 19 which, according to choice, may be a mere vent or may deliver to any suitable point, when gases escaping therethrough are to be recovered. Carried by the lower end of the shaft 17 is a bar 20, which carries vertical rods 21. The rods are connected at their lower ends by means of a bar 22, as will be clear from the drawing, and move in substantial contact with the inner surface of the pipe 12 so as to prevent the accumulation of any solid material thereon.

At its lower end the pipe 12 is reduced in size, as indicated at 25, and provided with a delivery pipe 23, extending upwardly to provide a trap, and thence to a suitable storage tank or shipping drum, indicated diagrammatically at 24, or to a flaking drum, if desired. Surrounding the restricted portion 25 of the pipe 12 is an insulated heating jacket 26, provided with any conventional heating device, such as a gas burner 27, which may be used for melting solid material within the portion 25 upon starting the reaction after interruption.

In order that the temperature of the molten NH4FHF in the portion 25 may be maintained at a suitable point by regulation of the flow of cooling water through the jacket 13, or otherwise, I provide a temperature indicator (not shown) which may include a thermocouple in a well 28, the inner end of which is closed, and the leads from which are indicated at 29. Likewise, in order that most effective proportioning of reactants may be effected, I provide a restricting means 30 comprising a thin wall having an orifice therein, a manometer 35, and a control valve 31 in the supply pipe 9, a control valve 32 in the supply pipe 8 and a well 33, similar to the well 28, in the reaction chamber R. The well 33 may receive a thermocouple forming a portion of a temperature indicator of usual construction, the leads from which are indicated at 34. The maximum temperature obtainable by regulation of the reactant supply is an index of approximately perfect proportioning thereof.

Assuming the device to be in operation, the restricted portion 25 will be filled up to the level of the outlet with molten NH4FHF, and HF and NH3 will be flowing through the pipes 8 and 9 respectively into the reaction space R in approximately the proportions in which they combine to form ammonium bifluoride. The heat of the reaction will maintain the selected reaction temperature. The reaction will occur principally, if not entirely, in the pipe 11 and the temperature in the space R may reach a point, as above indicated, of 125° C. or higher, depending upon conditions. A slight amount of the ammonium bifluoride formed in the reaction space and, depending upon the temperature, water and any excess of either reactant will be volatilized and pass out through the vent 19, while nearly all of the ammonium bifluoride will collect in liquid form in the restricted portion 25 and flow out through the pipe 23. The volatilized ammonium bifluoride will be substantially entirely condensed in the pipe 12 and, in liquid form, will pass down into the portion 25, thereby operating as a heat transfer medium to control the temperature of the discharged product, which should be below 150° C. to avoid excessive fuming. I have observed that some ammonium bifluoride is deposited in solid form in the inner wall of the pipe 12 when the temperature is kept low enough to condense substantially all the ammonium bifluoride which is volatilized. Accordingly, I find it advisable to provide mechanical means for keeping the inner wall of the pipe 12 clear of solid material which might otherwise entirely fill the interior at the upper end and prevent the passage of gas therethrough.

From the foregoing, it will be obvious that I have provided a process which is well adapted for the synthesis of ammonium bifluoride from substantially anhydrous HF and ammonia as well as suitable apparatus for use in connection therewith and, while I have disclosed the present preferred embodiment of the invention, I do not wish to be limited to the details of the disclosure, but only in accordance with the appended claims.

This application is a continuation-in-part of my copending application Serial No. 112,262, filed November 23, 1936.

Having thus described my invention, what I claim is:

1. A process for producing ammonium bifluoride, comprising bringing together in a reaction chamber hydrogen fluoride and ammonia in approximately the proportions in which they combine to form NH4FHF, the combined moisture content of said reactants being less than 5% of their combined weight, maintaining the temperature in the reaction chamber substantially above the melting point of NH4FHF, condensing in an enclosure, the gaseous NH4FHF resulting, and removing the substantially anhydrous product of the reaction from said enclosure in liquid condition.

2. Process of producing ammonium bifluoride comprising contacting ammonia of low moisture content with hydrogen fluoride of low moisture content in substantialy the proportion of one and two mols respectively, at a temperature above the melting point of ammonium bifluoride, condensing the gaseous ammonium bifluoride content of the reaction mixture to a liquid in a suitable, enclosed space and removing the product from said space in liquid condition.

3. Process of producing ammonium bifluoride comprising contacting $NH_3$ and $HF$ of low moisture content and in approximately the proportions of one mol $NH_3$ to two mols $HF$, said reactants being supplied continuously to a reaction chamber, continuously passing the reaction mixture to a condenser and there continuously liquefying the gaseous $NH_4FHF$ and drawing off the same from the condenser in liquid condition, the temperautre in said reaction chamber being maintained above the melting point of $NH_4FHF$.

4. The process recited in claim 3 wherein the HF is supplied to said reaction chamber in liquid state.

5. Process of producing ammonium bifluoride comprising contacting $NH_3$ and $HF$ of low moisture content and in approximately the proportions of one mol $NH_3$ to two mols $HF$, said reactants being supplied continuously to a reaction chamber, continuously passing the reaction mixture to a condenser and there continuously liquefying the gaseous $NH_4FHF$, and drawing off the same from the condenser in liquid condition, the temperature in said reaction chamber being maintained above the boiling point of $NH_4FHF$.

6. Process of producing ammonium bifluoride comprising contacting ammonia of low moisture content with hydrogen fluoride of low moisture content in substantially the proportion of one and two mols respectively, at a temperature above the melting point of ammonium bifluoride, condensing the gaseous ammonium bifluoride content of the reaction mixture to a liquid in a suitable, enclosed space and removing the product from said space in liquid condition at a temperature below 150° C.

ABE R. BOZARTH.